H. S. PLANT.
MICROMETER GAGE.
APPLICATION FILED FEB. 24, 1911.
1,072,493.
Patented Sept. 9, 1913.
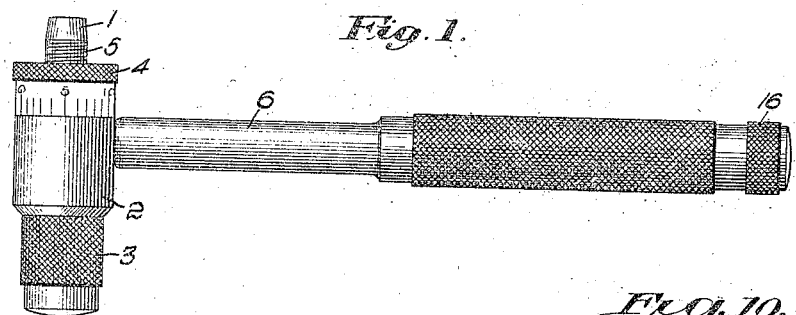
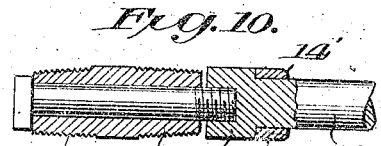
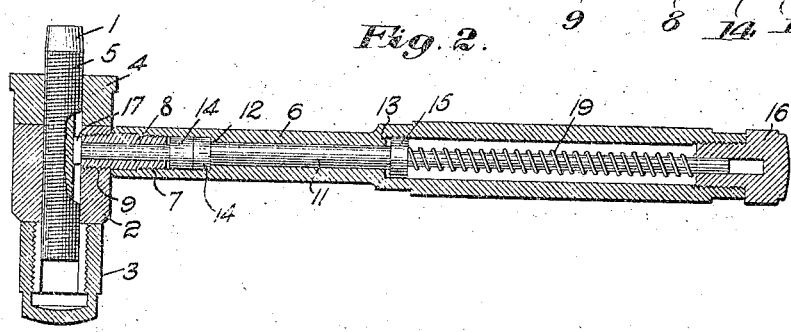
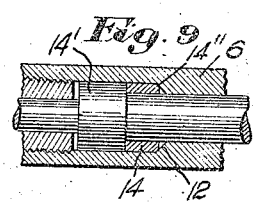
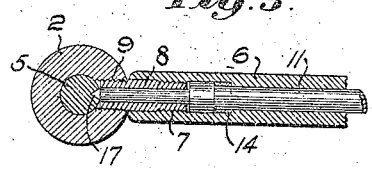
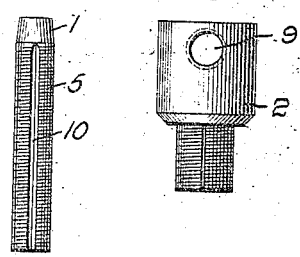
Witnesses:
Horace A. Crossman
Carl L. Choate
Inventor:
Henry S. Plant
by Emery, Booth, Janney & Varney Attys.

UNITED STATES PATENT OFFICE.

HENRY S. PLANT, OF MELROSE, MASSACHUSETTS.

MICROMETER-GAGE.

1,072,493.  Specification of Letters Patent.  Patented Sept. 9, 1913.

Application filed February 24, 1911. Serial No. 610,563.

*To all whom it may concern:*

Be it known that I, HENRY S. PLANT, a citizen of the United States, and a resident of Melrose, in the county of Middlesex and State of Massachusetts, have invented an Improvement in Micrometer-Gages, of which the following description, in connection with the accompanying drawings, is a specification, like characters on the drawings representing like parts.

This invention relates to micrometer gages more particularly adapted for interior measurements, and while the features thereof are susceptible of general application they are more particularly related to the gage disclosed in my Patent No. 934,692, dated September 21, 1909.

In order that the principle of the invention may be readily understood, I have disclosed a single embodiment thereof in the accompanying drawing, wherein—

Figure 1 is a side elevation of a micrometer gage embodying my invention; Fig. 2 is a view partly in vertical central section and partly in side elevation of the gage shown in Fig. 1; Fig. 3 is a transverse sectional detail taken through the body and handle of the gage; Figs. 4 to 8 inclusive are side elevations of parts of the gage; Fig. 9 is a sectional detail on an enlarged scale of a portion of the gage; Fig. 10 is a detail representing one manner of forming the spindle.

The parts herein represented are substantially double the size that in practice I have found to be convenient but it is to be understood that they may be of any desired size and proportion.

Referring more particularly to that embodiment of my invention selected for illustration, the distance pin is indicated at 1, it being contained in and adapted to be suitably projected from a receiver 2 preferably of general cylindrical form and having if desired upon its lower and preferably split end a cap 3 capable of suitable adjustment to compensate for wear. Preferably said cap is threaded onto the receiver. The pin 1 may be projected from the receiver in any suitable manner, as, for example, by means of a nut 4 mounted upon the threaded portion 5 of the pin 1, as fully disclosed in my said patent. Any suitable pin projecting means may, however, be employed. I provide the receiver 2 with a suitable manipulating and gage balancing handle 6 shown as laterally projecting therefrom and as of a length preferably exceeding that of the receiver 2. It may be connected in suitable manner to said receiver, but is here shown as interiorly threaded at 7 onto a short bushing 8 which itself is threaded, as indicated at 9, into the receiver. The handle 6 is provided with suitable means to engage the distance pin 1, so as not only to restrain said pin from rotation while it is being projected by rotation of the nut 4, but so as to lock the said pin when projected to the proper extent. For that purpose I preferably longitudinally groove the pin 1, as indicated at 10, said groove being preferably V shaped in cross section as more clearly shown in Fig. 3. While any suitable means may be provided to enter said groove 10 to restrain the pin 1 from rotation or to lock it in adjusted position, I have herein provided a spindle 11 axially positioned within the handle 6, which is here represented as provided with annular shoulders 12 and 13 to respectively engage collars or enlargements 14, 15 upon the spindle 11. The spindle 11 may have a shoulder against which the part 15 rests, if the latter be formed as a collar. The spindle is provided with an enlargement 14′ which as it is integral with the spindle is therefore of comparatively soft metal. The collar 14 contacting with said enlargement is, however, of relatively hard metal compared with the spindle and the enlargement 14′, as is also the handle 6. That edge of the collar 14 which is the more remote from the enlargement 14′ is slightly curved as indicated at 14″ in Fig. 9, and the corresponding shoulder 12 within the handle 6 is formed upon a bevel as indicated most clearly in Fig. 9. Therefore, the contact between the shoulder 12 and adjacent face of the collar 14 is limited to a relatively narrow band or line. Owing to the described construction, the manipulation of the handle 6 to lock the pin 1 in adjusted position does not form a bur upon the collar 14, as would be the case if hard and soft metal parts here contacted.

At its outer end the handle 6 is provided with a cap 16 threaded thereinto, the cap being represented as socketed to receive the outer end of the spindle 11. The inner end of the spindle is provided with a preferably wedge shaped inner end 17 to enter the groove 10 of the pin 1. The collar 15 is adapted to be held against the annular shoulder 13 in the handle by means of a coiled spring 19 suitably tensioned between the collar 15 and cap 16 as illustrated.

In assembling the parts, the bushing 8 is slipped onto the outer end of the spindle 11 which in practice is made in two parts threaded together as by the internally threaded enlargement 14' Fig. 10 to receive the externally threaded end of the other part. The bushing 8 is slid forward to the pointed or wedge shaped end 17. Thereafter the collar 14 is positioned on the spindle. The spindle may then be inserted into the handle 6, which is threaded onto the bushing 8 as described, after which the collar 15 and spring 19 are placed onto the spindle and the cap 16 is then screwed into position.

Assuming the distance pin 1 to have been projected to the desired extent, the handle 6 is turned in a clockwise direction until the shoulder 12 upon the handle is brought into engagement with the collar 14 upon the spindle 11, thereby positively projecting or holding the point of the spindle tightly in the groove 10, so that the distance pin 1 is set or locked in position. If now the handle 6 be turned slightly in the opposite direction,—that is contraclockwise,—then the handle 6 is moved outward slightly from the receiver 2 and the shoulder 12 is withdrawn slightly from the collar 14, but the spring 19, because it is tensioned between the cap 16 and collar 15, forces the spindle 11 yieldingly inward so that its pointed end 17 is yieldingly maintained in the groove 10 of the pin 1. Slight play may exist between the pointed end 17 and the bottom of the groove 10. Therefore said pin 1 is restrained from rotation and by rotation of the nut 4 the axial position of said distance pin 1 may be changed. It will therefore be apparent that during the axial positioning of the pin 1, the said pin is held from rotation by the stress of the spring 19 and that when the pin has been suitably projected to the desired extent the tightening of the handle effects the instant locking of the pin in its projected position. If now the handle 6 be still further rotated in a contraclockwise direction, it is evident that the shoulder 13 brings up against the collar 15 and that therefore the tension of the spring 19 no longer is borne by the spindle 11 but by the handle 6. Therefore the distance pin 1 may be readily removed for the substitution of a pin of different length without undue friction of the point 17 in the groove 10.

Having thus described one illustrative embodiment of my invention, I desire it to be understood that although specific terms are employed, they are used in a generic and descriptive sense and not for purposes of limitation, the scope of the invention being set forth in the following claims.

Claims.

1. A micrometer gage having a distance pin, a receiver therefor from which said pin may be projected, a laterally extending handle, means whereby the same is adjustably mounted on said receiver, a spindle within the handle, and a spring to project said spindle into engagement with the said pin, said handle having a spring-compressing shoulder and coöperating spring pressing means to engage and control the tension of the spring, whereby the spring projection of the spindle is controlled by the adjustment of the handle.

2. A micrometer gage having a distance pin, a receiver therefor and from which said pin may be projected, a handle having spring actuated means to engage the pin and also having means to transfer the spring pressure from the pin to the handle.

3. A micrometer gage having a distance pin, a receiver therefor and from which said pin may be projected, a laterally projecting handle, means whereby the handle is adjustably attached to the receiver, a spindle therein and movable longitudinally thereof and having a protruding, pin-engaging end, said spindle and said handle being respectively provided with coöperating projections normally separated when the pin is projected and which may be brought into engagement by handle adjustment, thereby to hold the spindle in non-locking position.

4. A micrometer gage having a distance pin, a receiver therefor and from which said pin may be projected, a laterally projecting handle, having means for adjustably attaching it to said receiver, a spindle within said handle thereof, interengaging projections upon the spindle and handle respectively, to lock the spindle in engagement with the pin, and interengaging projections upon the spindle and handle to hold the spindle in non-locking position.

5. A micrometer gage having a distance pin, a receiver therefor and from which said pin may be projected, a handle laterally projecting from the receiver, means for effecting longitudinal adjustment of said handle, an axial spindle carried by the handle, a spring to press said spindle into engagement with said pin and interengaging locking formations upon the spindle and handle, whereby rotation of said handle effects locking of the pin by the spindle and opposite rotation of the handle effects its release.

6. A micrometer gage having a distance pin, a receiver therefor and from which said pin may be projected, a laterally extending fixed bushing, a handle adjustably mounted thereon, a spindle therein having an enlargement which is engaged by said handle, and a spring to project said spindle.

7. A micrometer gage having a distance pin, a receiver therefor and from which said pin may be projected, a laterally extending fixed bushing, a handle adjustably mounted thereon, a spindle carried by said bushing, and a spring to project said spindle into engagement with the pin, said spring projection of the spindle being controlled by adjustment of the handle.

8. A micrometer gage having a distance pin, a receiver therefor from which said pin may be projected, a laterally extending bushing threaded into said receiver, a handle threaded onto and adjustable with respect to said bushing, a spring pressed spindle mounted within said handle and having an end extending through said bushing to contact with said distance pin, the distance pin being restrained from rotation or locked in adjusted position by manipulation of the handle.

9. A micrometer gage having a distance pin, a receiver therefor from which said pin may be projected, a hollow handle 6 extending from and having means for adjustably uniting it to said receiver, said handle having an internal shoulder 13, a spindle 11 mounted within said handle and having enlargements 14 and 15, and a spiral spring 19 surrounding said spindle and engaging the enlargement 15 and the handle end.

10. A micrometer gage having a distance pin, a receiver therefor from which said pin may be projected, a handle 6 laterally extended from said receiver and having means for adjustably connecting it thereto and having an internal shoulder 13, a spindle 11 having collars 14 and 15, an enlargement 14', and a coil spring 19 surrounding said spindle and engaging said collar 15 and the handle end.

In testimony whereof, I have signed my name to this specification, in the presence of two subscribing witnesses.

HENRY S. PLANT.

Witnesses:
 IRVING U. TOWNSEND,
 ROBERT H. KAMMLER.